(12) United States Patent
Kyono

(10) Patent No.: US 8,189,355 B2
(45) Date of Patent: May 29, 2012

(54) MULTIPLE OUTPUT SWITCHING POWER SOURCE APPARATUS

(75) Inventor: Yoichi Kyono, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 304 days.

(21) Appl. No.: 12/667,973

(22) PCT Filed: Aug. 18, 2008

(86) PCT No.: PCT/JP2008/064699
§ 371 (c)(1),
(2), (4) Date: Jan. 6, 2010

(87) PCT Pub. No.: WO2009/028344
PCT Pub. Date: Mar. 5, 2009

(65) Prior Publication Data
US 2011/0002146 A1    Jan. 6, 2011

(30) Foreign Application Priority Data

Aug. 27, 2007  (JP) .................................. 2007-220068

(51) Int. Cl.
*H02M 7/08* (2006.01)
*H02M 5/42* (2006.01)

(52) U.S. Cl. ........................................... 363/70; 363/86

(58) Field of Classification Search ...................... 307/31
See application file for complete search history.

(56) References Cited

U.S. PATENT DOCUMENTS

| 6,504,267 B1 * | 1/2003 | Giannopoulos ................. 307/31 |
| 7,315,460 B2 | 1/2008 | Kyono |
| 7,339,799 B2 | 3/2008 | Osaka et al. |
| 7,375,987 B2 | 5/2008 | Kyono |
| 7,505,288 B2 * | 3/2009 | Duvnjak ..................... 363/21.18 |
| 7,629,781 B2 | 12/2009 | Kyono |
| 2009/0256423 A1 | 10/2009 | Kyono |
| 2010/0046251 A1 | 2/2010 | Kyono |

FOREIGN PATENT DOCUMENTS

| JP | 4 140063 | 5/1992 |
| JP | 2000 32753 | 1/2000 |
| JP | 2000 324822 | 11/2000 |
| JP | 2002101662 | * 4/2002 |
| JP | 2003 259644 | 9/2003 |

OTHER PUBLICATIONS

U.S. Appl. No. 12/442,824, filed Mar. 25, 2009, Kyono.
U.S. Appl. No. 12/663,290, filed Dec. 7, 2009, Kyono.

* cited by examiner

*Primary Examiner* — Rexford N Barnie
*Assistant Examiner* — Toan Vu
(74) *Attorney, Agent, or Firm* — Oblon, Spivak, McClelland, Maier & Neustadt, L.L.P.

(57) ABSTRACT

A multiple-output switching power source apparatus includes a control circuit to adjust a time for applying a DC voltage to a primary winding of a transformer by turning on/off a switching element Q1, a first rectifying-smoothing circuit for a first secondary winding of the transformer, a second rectifying-smoothing circuit for a switching element Q2 to provide a second output voltage connected to an output terminal of the first rectifying-smoothing circuit through the switching element Q2, a third rectifying-smoothing circuit for a second secondary winding of the transformer and provide a third output voltage, a first end of the second secondary winding of the transformer being connected to the switching element Q2, and a control circuit 13 to adjust an ON/OFF time of the switching element Q2 according to the voltage of the first secondary winding of the transformer, the second output voltage, and the third output voltage.

5 Claims, 7 Drawing Sheets

MULTIPLE OUTPUT SWITCHING POWER SOURCE APPARATUS

TECHNICAL FIELD

The present invention relates to a multiple-output switching power source apparatus having a plurality of outputs.

BACKGROUND TECHNOLOGY

FIG. 1 is a circuit diagram illustrating a configuration of a multiple-output switching power source apparatus according to a related art. In this multiple-output switching power source apparatus, an input voltage Vin is a DC voltage formed by rectifying and smoothing an AC voltage from a commercial power source. Between the input voltage Vin, a primary winding P1 of a transformer T1 and a switching element Q1 made of, for example, a MOSFET are connected in series. A control circuit 12-1 controls ON/OFF of the switching element Q1.

On the secondary side of the transformer T1, there is a rectifying-smoothing circuit connected to a secondary winding S1 that is wound so as to generate a voltage whose phase is opposite to the phase of a voltage of the primary winding P1 of the transformer T1. The rectifying-smoothing circuit has a diode D1 and a smoothing capacitor C1, to rectify and smooth a voltage induced by the secondary winding S1 of the transformer T1 and outputs the voltage as a first output voltage Vo1 from a first output terminal.

The converter to provide the first output voltage Vo1 is generally known as a flyback converter that accumulates excitation energy in the primary winding P1 of the transformer T1 during an ON period of the switching element Q1, and after the switching element Q1 turns off, discharges energy through the diode D1 to the output. A feedback circuit 10 feeds back an error signal between the first output voltage Vo1 and a reference voltage to the control circuit 12-1 on the primary side. Based on the error signal, the control circuit 12-1 adjusts an ON width of the switching element Q1, to control the first output voltage Vo1 to a predetermined value.

A second output voltage Vo2 and a third output voltage Vo3 are provided by DC/DC converters such as step-down choppers connected to the first output terminal of the flyback converter.

The step-down choppers have switching elements Q2 and Q3 and reactors L2 and L3 those are connected in series among the first output terminal, a second output terminal, and a third output terminal. Between connection points of the switching elements Q2 and Q3 and reactors L2 and L3 and the ground, there are connected regenerative diodes D2 and D3.

Control circuits 12-2 and 12-3 control ON widths of the switching elements Q2 and Q3, to thereby control output voltages. During periods in which the switching elements Q2 and Q3 are ON, power is supplied from the first output terminal to the second and third output terminals through the reactors L2 and L3. After the switching elements turn off, energy accumulated in the reactors L2 and L3 is discharged through the regenerative diodes D2 and D3 to the second and third output terminals.

In a load zone in which current continuously passes through the reactors L2 and L3, the second and third output voltages Vo2 and Vo3 are averages of voltages applied to the reactors L2 and L3. If the switching elements Q2 and Q3 have an ON duty of Don, the output voltages Vo2 and Vo3 each is approximately "Vo1×Don". In a light load zone in which current discontinuously passes to the reactors L2 and L3, power to be outputted corresponds to ON widths of the switching elements Q2 and Q3.

DISCLOSURE OF INVENTION

The above-mentioned multiple-output switching power source apparatus is capable of accurately providing the three output voltages Vo1, Vo2, and Vo3. To provide the second output voltage Vo2 and third output voltage Vo3, the DC/DC converters must have parts such as switching elements, choke coils, and control ICs, to increase costs and a package area. If the converters operate at different frequencies, interference will occur between them to destabilize operation.

Another known related art is disclosed in, for example, Japanese Unexamined Patent Application Publication No. 2003-259644.

As explained above, the multiple-output switching power source apparatus according to the related art must prepare a DC/DC converter for each output, to cause the problem of increasing costs and a package area due to additional parts. In addition, interference among outputs may destabilize operation.

The present invention provides a multiple-output switching power source apparatus using an inexpensive circuit configuration capable of stabilizing outputs.

To solve the above-mentioned problems, a first technical aspect of the present invention provides a multiple-output switching power source apparatus that includes a transformer having a primary winding, a first secondary winding, and a second secondary winding, a first control circuit to adjust a time for applying a DC voltage to the primary winding of the transformer by turning on/off a first switching element, a first rectifying-smoothing circuit to rectify and smooth a voltage generated by the first secondary winding of the transformer and provide a first output voltage, a second switching element whose first end is connected to an output terminal of the first rectifying-smoothing circuit, a second rectifying-smoothing circuit connected to a second end of the second switching element, to rectify and smooth a voltage generated at the second end of the second switching element and provide a second output voltage, a third rectifying-smoothing circuit to rectify and smooth a voltage generated at a second end of the second secondary winding of the transformer and provide a third output voltage, a first end of the second secondary winding of the transformer being connected to the second end of the second switching element, and a second control circuit to adjust an ON/OFF time of the second switching element according to the second and third output voltages.

According to a second technical aspect of the present invention, the second control circuit in the multiple-output switching power source apparatus of the first technical aspect adjusts, according to the third output voltage, a time from when the first switching element turns on to when the second switching element turns on, and according to the second output voltage, adjusts a period during which the second switching element is ON.

According to a third technical aspect of the present invention, the second control circuit in the multiple-output switching power source apparatus of the first technical aspect adjusts, according to the third output voltage, a time from when the first switching elements turns off to when the second switching element turns on, and according to the second output voltage, adjusts a period during which the second switching element is ON.

According to a fourth technical aspect of the present invention, the second control circuit in the multiple-output switching power source apparatus of the first technical aspect adjusts, according to the third output voltage, a time from when the voltage of the first secondary winding of the transformer rises to when the second switching element turns on, and according to the second output voltage, adjusts a period during which the second switching element is ON.

According to a fifth technical aspect of the present invention, the second control circuit in the multiple-output switching power source apparatus of the first technical aspect adjusts, according to the third output voltage, a time from when the voltage of the first secondary winding of the transformer falls to when the second switching element turns on, and according to the second output voltage, adjusts a period during which the second switching element is ON.

BEST MODE OF IMPLEMENTING INVENTION

Multiple output switching power source apparatuses according to embodiments of the present invention will be explained in detail with reference to the drawings.

Embodiment 1

Figure 2:
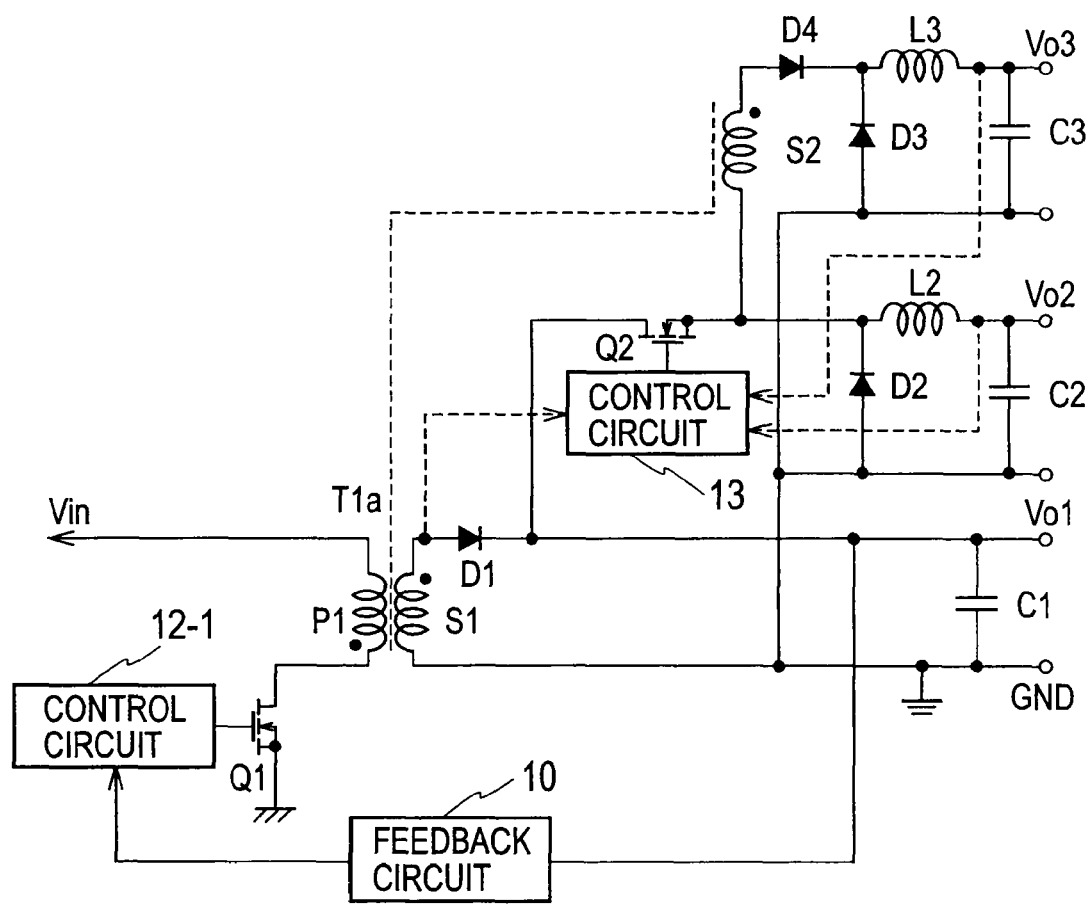
FIG. 2 is a circuit diagram illustrating a configuration of a multiple-output switching power source apparatus according to Embodiment 1 of the present invention.

FIG. 2 is a circuit diagram illustrating a configuration of a multiple-output switching power source apparatus according to Embodiment 1 of the present invention. In this multiple-output switching power source apparatus, a transformer T1a has a primary winding P1, a first secondary winding S1, and a second secondary winding S2.

A converter for providing a first output voltage Vo1 is a flyback converter. An input voltage Vin is a DC voltage formed by rectifying and smoothing an AC voltage from a commercial power source. Between the input voltage Vin, the primary winding P1 of the transformer T1a and a switching element (first switching element) Q1 such as a MOSFET are connected in series. A control circuit (first control circuit) 12-1 controls ON/OFF of the switching element Q1 at a predetermined frequency, to switch the DC voltage Vin and apply the same to the primary winding P1 of the transformer T1a.

On the secondary side of the transformer T1a, there is a rectifying-smoothing circuit (first rectifying-smoothing circuit) connected to the first secondary winding S1 that is wound to generate a voltage whose phase is opposite to the phase of a voltage of the primary winding P1 of the transformer T1a. This rectifying-smoothing circuit has a diode D1 and a smoothing capacitor C1, to rectify and smooth a voltage induced by the first secondary winding S1 of the transformer T1a and provide a first output voltage Vo1 from a first output terminal.

A feedback circuit 10 feeds back an error signal between the first output voltage Vo1 and a reference voltage to the control circuit 12-1 on the primary side. Based on the error signal, the control circuit 12-1 adjusts an ON width of the switching element Q1 to control the first output voltage Vo1 to a predetermined voltage.

A second output voltage Vo2 is provided by a DC/DC converter such as a step-down chopper connected to the first output terminal of the flyback converter. Between the first output terminal and the second output terminal, a switching element (second switching element) Q2 such as a MOSFET and a reactor L2 are connected in series.

Between a connection point of the switching element Q2 and reactor L2 and the ground, a regenerative diode D2 is connected. The diode D2, reactor L2, and smoothing capacitor C2 form a rectifying-smoothing circuit (second rectifying-smoothing circuit).

A control circuit (second control circuit) 13 is connected to a gate terminal of the switching element Q2, a connection point between a first end of the secondary winding S1 of the transformer T1a and an anode of the diode D1, a first end of the capacitor C2, and a first end of a capacitor C3, to control ON/OFF of the switching element Q2. The details of the control circuit 13 will be explained later.

The second secondary winding S2 and first secondary winding S1 of the transformer T1a are wound to generate voltages of the same phase. A connection point of the switching element Q2 and reactor L2 is connected to a first end of the second secondary winding S2 of the transformer T1a, a second end of the second secondary winding S2 is connected to an anode of a diode D4, and a cathode of the diode D4 is connected to a smoothing circuit consisting of a reactor L3 and the capacitor C3, to provide a voltage across the capacitor C3 as a third output voltage Vo3. Between a connection point of the diode D4 and reactor L3 and the ground, a regenerative diode D3 is connected. The diodes D3 and D4, reactor L3, and smoothing capacitor C3 form a rectifying-smoothing circuit (third rectifying-smoothing circuit).

Figure 3:
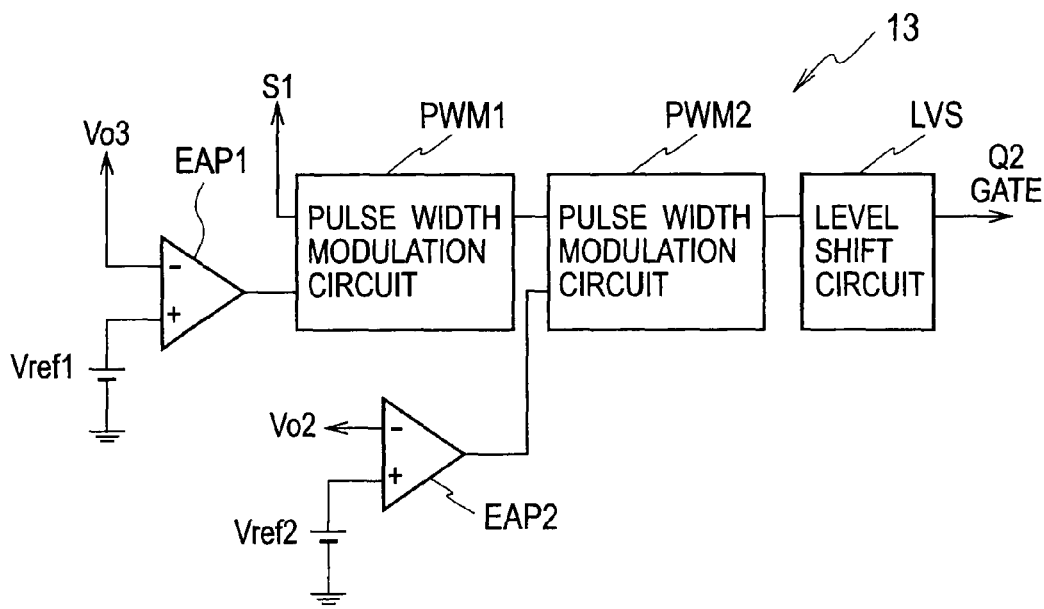
FIG. 3 is an internal circuit diagram of a control circuit 13 in the multiple-outputs switching power source apparatus according to Embodiment 1.
Figure 4:
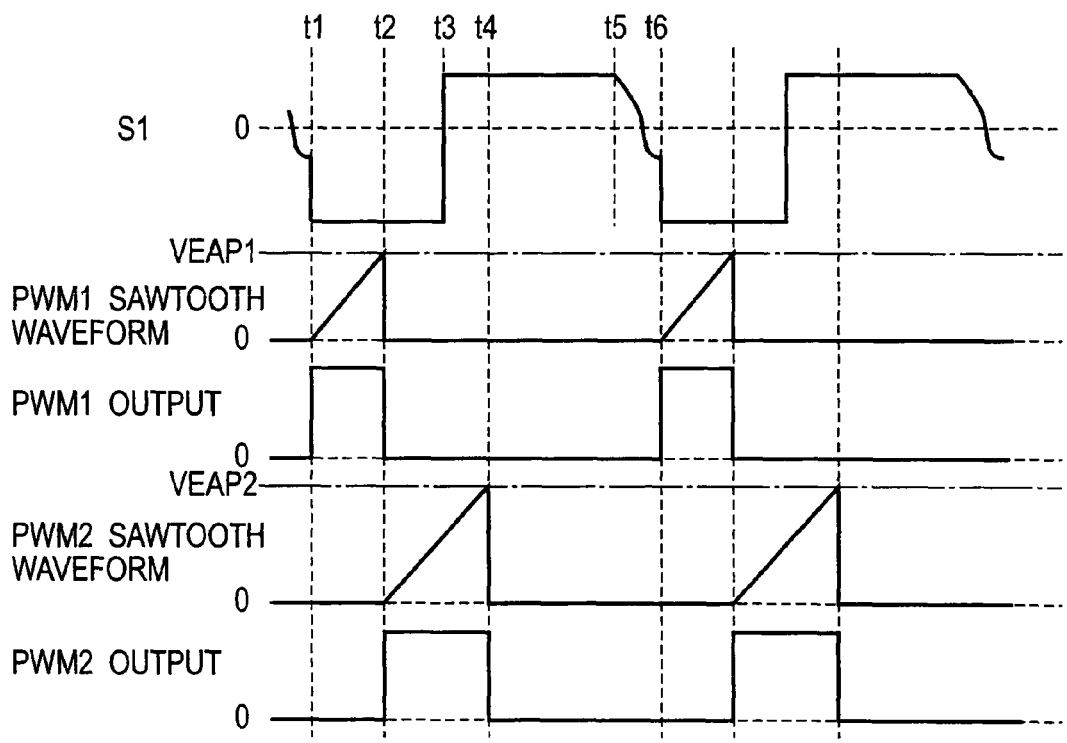
FIG. 4 is a timing chart illustrating operation of the control circuit 13 according to Embodiment 1.

Next, an internal circuit of the control circuit 13 will be explained. FIG. 3 is an internal circuit diagram of the control circuit 13 in the multiple-output switching power source apparatus according to Embodiment 1. FIG. 4 is a timing chart illustrating operation of the control circuit 13 according to Embodiment 1.

The control circuit 13 has an error amplifier EAP1, an error amplifier EAP2, a pulse width modulation circuit PWM1, a pulse width modulation circuit PWM2, and a level shift circuit LVS.

An inverting input terminal of the error amplifier EAP1 is connected to the first end of the capacitor C3, to receive the third output voltage Vo3 and a non-inverting input terminal thereof receives a reference voltage Vref1. An inverting input terminal of the error amplifier EAP2 is connected to the first end of the capacitor C2, to receive the second output voltage Vo2 and a non-inverting input terminal thereof receives a reference voltage Vref2.

Input terminals of the pulse width modulation circuit PWM1 are connected to the first end of the secondary winding S1 of the transformer T1a and an output terminal of the error amplifier EAP1. Input terminals of the pulse width modulation circuit PWM2 are connected to an output terminal of the pulse width modulation circuit PWM1 and an output terminal of the error amplifier EAP2. An output terminal of the pulse width modulation circuit PWM2 is connected through the level shift circuit LVS to the gate terminal of the switching element Q2.

Next, operation of the control circuit 13 illustrated in FIG. 3 will be explained with reference to the timing chart of FIG. 4.

The error amplifier EAP1 compares the third output voltage Vo3 with the reference voltage Vref1 and outputs an error voltage signal VEAP1 between the third output voltage Vo3 and the reference voltage Vref1 to the pulse width modulation circuit PWM1.

The pulse width modulation circuit PWM1 outputs (for example, at time t1) a pulse voltage (PWM1 output) in synchronization with a negative voltage generated by the first secondary winding S1 of the transformer T1a, i.e., in synchronization with ON of the switching element Q1. At the same time, a sawtooth wave generation circuit therein generates a PWM1 sawtooth waveform signal.

When the voltage of the PWM1 sawtooth waveform signal reaches (for example, at time t2) the voltage VEAP1 from the error amplifier EAP1, the pulse voltage from the pulse width modulation circuit PWM1 becomes low. Namely, in response to the voltage VEAP1 from the error amplifier EAP1, a period (the period from t1 to t2) during which the pulse width modulation circuit PWM1 outputs a pulse voltage changes.

The third output voltage Vo3 is supplied to the inverting input terminal of the error amplifier EAP1, and when the third output voltage Vo3 exceeds the reference voltage Vref1, the voltage VEAP1 from the error amplifier EAP1 decreases to shorten the period during which the pulse width modulation circuit PWM1 outputs a pulse voltage. On the other hand, when the third output voltage Vo3 drops below the reference voltage Vref1, the voltage VEAP1 from the error amplifier EAP1 increases to elongate the period during which the pulse width modulation circuit PWM1 outputs a pulse voltage.

The error amplifier EAP2 compares the second output voltage Vo2 with the reference voltage Vref2 and outputs an error voltage signal VEAP2 between the second output voltage Vo2 and the reference voltage Vref2 to the pulse width modulation circuit PWM2.

The pulse width modulation circuit PWM2 outputs (for example, at time t2) a pulse voltage (PWM2 output) in synchronization with a fall of the pulse voltage from the pulse width modulation circuit PWM1. At the same time, a sawtooth wave generation circuit therein generates a PWM2 sawtooth waveform signal.

When the voltage of the PWM2 sawtooth waveform signal reaches (for example, at time t4) the voltage VEAP2 from the error amplifier EAP2, the pulse voltage from the pulse width modulation circuit PWM2 becomes low. Namely, in response to the voltage VEAP2 from the error amplifier EAP2, a period (the period from t2 to t4) during which the pulse width modulation circuit PWM2 outputs a pulse voltage changes.

The second output voltage Vo2 is supplied to the inverting input terminal of the error amplifier EAP2, and when the second output voltage Vo2 exceeds the reference voltage Vref2, the voltage VEAP2 from the error amplifier EAP2 decreases to shorten the period during which the pulse width modulation circuit PWM2 outputs a pulse voltage. On the other hand, when the second output voltage Vo2 drops below the reference voltage Vref2, the voltage VEAP2 from the error amplifier EAP2 increases to elongate the period during which the pulse width modulation circuit PWM2 outputs a pulse voltage.

The pulse voltage from the pulse width modulation circuit PWM2 is applied through the level shift circuit LVS to the gate terminal of the switching element Q2, to turn on/off the switching element Q2.

In this way, the control circuit 13 controls, with the third output voltage Vo3, a time (for example, from t1 to t2) from when the switching element Q1 turns on to when the switching element Q2 turns on, and with the second output voltage Vo2, a time (for example, from t2 to t4) in which the switching element Q2 is ON.

Figure 5:
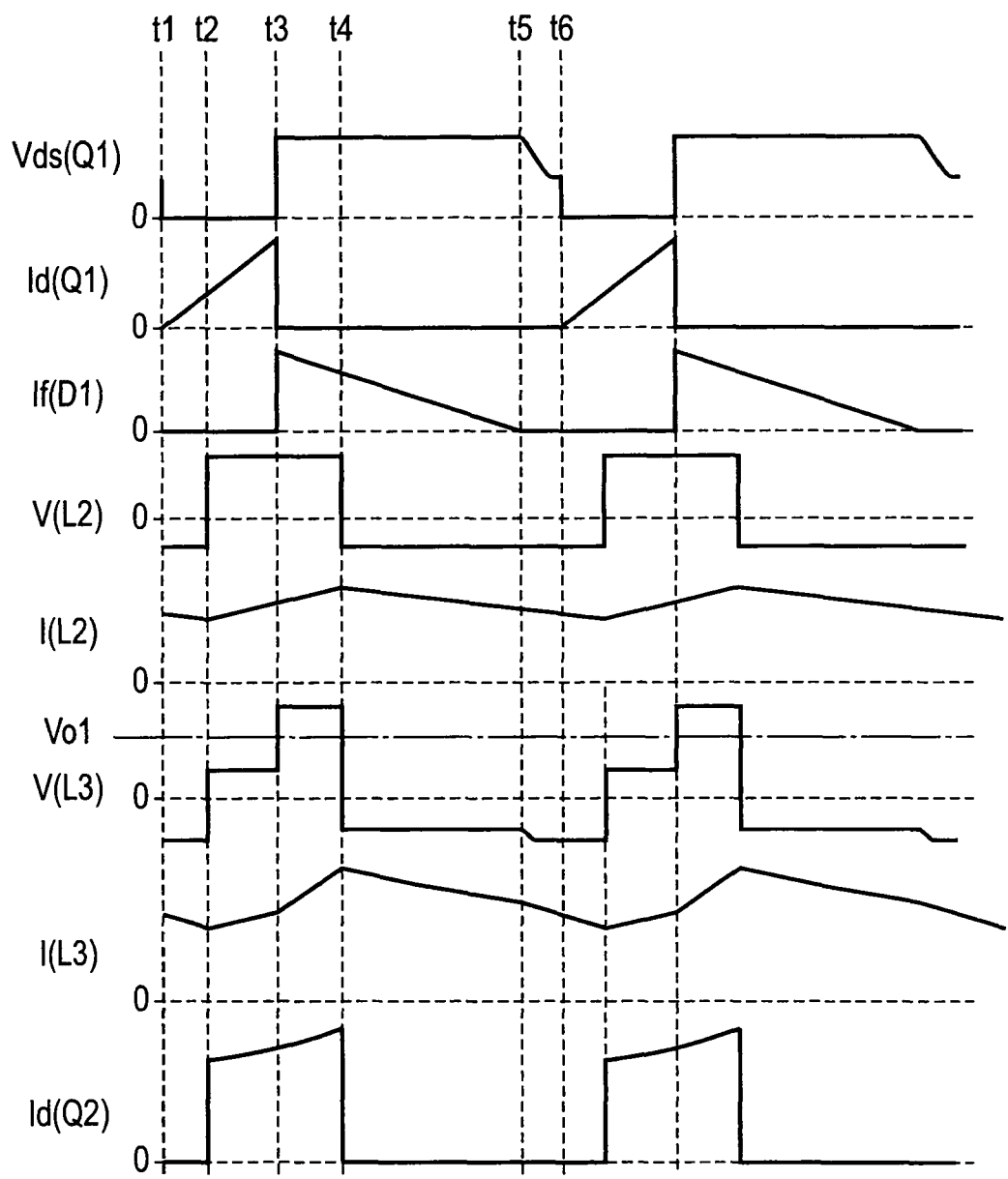
FIG. 5 is a waveform diagram illustrating operation under heavy load of the multiple-output switching power source apparatus according to Embodiment 1 of the present invention.

FIG. 5 is a waveform diagram illustrating operation under heavy load of the multiple-output switching power source apparatus according to Embodiment 1 of the present invention. Namely, it illustrates operational waveforms when load connected to the second output terminal is heavy.

Next, with reference to FIG. 5, the operation under heavy load of the multiple-output switching power source apparatus according to Embodiment 1 will be explained.

In FIG. 5, Vds(Q1) is a drain-source voltage of the switching element Q1, Id(Q1) is a drain current of the switching element Q1, If(D1) is a current passing through the diode D1, V(L2) is a voltage across the reactor L2, I(L2) is a current passing to the reactor L2, V(L3) is a voltage across the reactor L3, I(L3) is a current passing through the reactor L3, and Id(Q2) is a drain current of the switching element Q2.

At time t1, a signal from the control circuit 12-1 turns on the switching element Q1, the input voltage Vin is applied to the primary winding P1 of the transformer T1a, and an excitation current of the primary winding P1 passes as the drain current Id(Q1) of the switching element Q1.

At time t2, a signal from the control circuit 13 turns on the switching element Q2, the reactor L2 receives a differential voltage V(L2) between the first output voltage Vo1 and the second output voltage Vo2, and therefore, the current I(L2) of the reactor L2 increases.

At the same time, the reactor L3 receives through the diode D4 a differential voltage V(L3) between a voltage obtained by subtracting the voltage of the second secondary winding S2 from the first output voltage Vo1 and the third output voltage Vo3, and therefore, the current I(L3) of the reactor L3 increases. The voltage of the second secondary winding S2 is a voltage obtained by multiplying the input voltage by a turn ratio of the primary winding P1 and second secondary winding S2.

At time t3, the switching element Q1 turns off and excitation energy accumulated in the transformer T1a is discharged as the forward current If(D1) of the diode D1 from the first secondary winding S1 of the transformer T1a, is smoothed by the capacitor C1, and is outputted to the first output terminal.

At the same time, the voltage of the second secondary winding S2 of the transformer T1a inverts and the second secondary winding S2 generates a voltage obtained by multiplying the voltage of the first secondary winding S1, i.e., approximately the first output voltage Vo1 by the turn ratio. The voltage V(L3) applied to the reactor L3 changes to a differential voltage between a voltage obtained by adding the voltage of the second secondary winding S2 to the first output voltage Vo1 and the third output voltage Vo3, to change an inclination of the current I(L3) to the reactor L3.

At time t4, the switching element Q2 turns off, the voltage V(L2) applied to the reactor L2 disappears, and energy accumulated in the reactor L2 is discharged through the regenerative diode D2 to the second output terminal.

Also, the voltage V(L3) applied to the reactor L3 disappears and energy accumulated in the reactor L3 is discharged to the third output terminal through a path extending along the diode D2, secondary winding S2, diode D4, reactor L3 or regenerative diode D3, and reactor L3. The energy accumulated in the transformer T1a is continuously discharged through the diode D1 to the first output terminal.

At time t5, the discharge of the energy accumulated in the transformer T1a ends, and at time t6, the switching element Q1 again turns on to restore the state of time t1. The above-mentioned operation is repeated to supply power to the second output terminal and third output terminal.

The converter to provide the second output voltage V02 has a structure similar to the step-down chopper of the related art, and therefore, the second output voltage Vo2 is determined by an input voltage, i.e., the first output voltage Vo1 and the ON/OFF duty ratio of the switching element Q2. Namely, the control circuit 13 controls the time from t2 to t4, to control the second output voltage Vo2.

Like the converter to provide the second output voltage Vo2, the converter to provide the third output voltage Vo3 employs the reactor L3 and capacitor C3 to average voltages applied in the period from t3 to t5 and output the averaged voltage.

Unlike the converter to provide the second output voltage Vo2, the converter to provide the third output voltage Vo3 differs a voltage applied to the reactor L3 in the period from t2 to t3 from that applied thereto in the period from t3 to t4. With T being one period, T2-3 a time from t2 to t3, T3-4 a time from t3 to t4, V2-3 a voltage applied to the reactor L3 in the period from t2 to t3, and V3-4 a voltage applied to the reactor L3 in the period from t3 to t4, the third output voltage Vo3 is approximately given by (V2-3×T2-3+V3-4×T3-4)/T during a period in which the current I(L3) of the reactor L3 continuously passes.

The voltage V3-4 is larger than the voltage V2-3 in voltage value, and therefore, extending the period T3-4 results in increasing the third output voltage Vo3 and shortening the period T3-4 results in decreasing the third output voltage Vo3. Namely, the control circuit 13 controls the time from t1 to t2, to change the period T3-4 and control the third output voltage Vo3.

Figure 6:
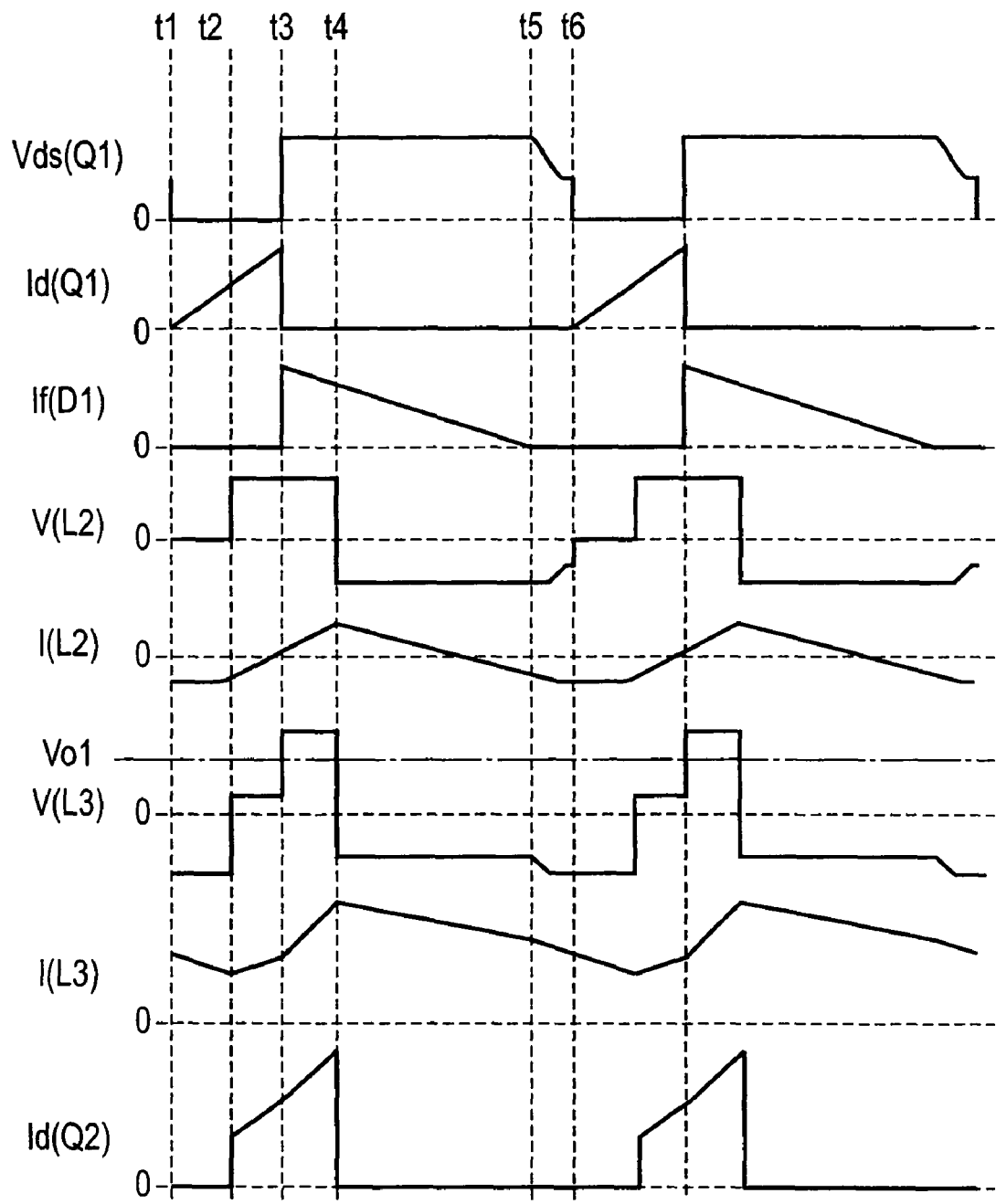
FIG. 6 is a waveform diagram illustrating operation under light load of the multiple-output switching power source apparatus according to Embodiment 1 of the present invention.

Next, operation when load connected to the second output terminal is light will be explained with reference to the operational waveforms of FIG. 6.

In general, in a light load zone in which a current passing through a reactor of a step-down chopper becomes discontinuous, the ON width of a switching element is narrowed to stabilize an output voltage. According to the converter of Embodiment 1, energy is also supplied to the third output terminal during an ON period of the switching element Q2. Accordingly, if the ON width of the switching element Q2 is excessively narrowed depending on a load state of the second converter, there is a risk of supplying no power to the third output terminal.

The converter of Embodiment 1, however, passes the regenerative energy of the reactor L3 through a path extending along the capacitor C2, reactor L2, secondary winding S2, diode D4, and reactor L3 during regenerative periods of the reactors L2 and L3 from t4 to t6 after the current of the reactor L2 becomes 0 A.

Namely, in the zone in which the load of the second output terminal is light, energy accumulated in the capacitor C2 is used as energy supplied to the third output terminal during an OFF period of the switching element Q2. As a result, the ON width of the switching element Q2 never becomes too narrow, and therefore, the third output terminal is stabilized in the zone in which the load of the second output terminal is light.

Figure 1:
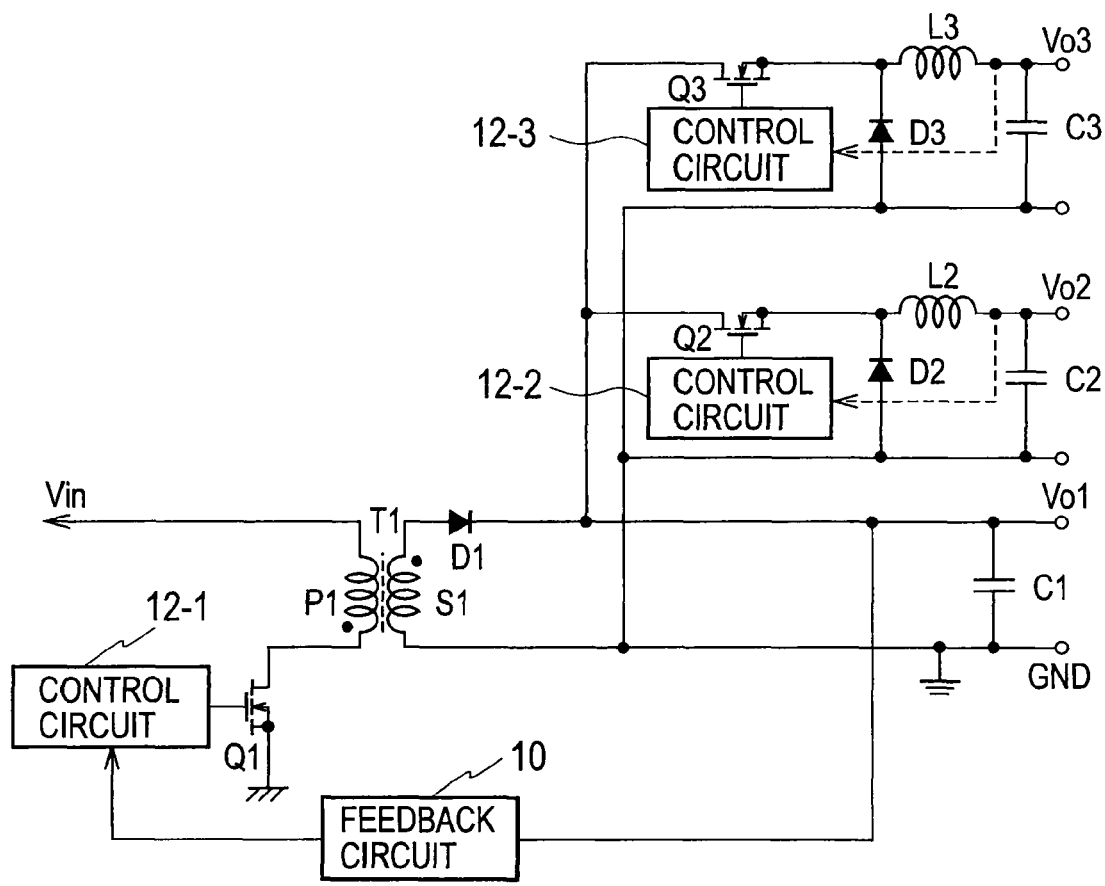
FIG. 1 is a circuit diagram illustrating a configuration of a multiple-output switching power source apparatus according to a related art.

In this way, the multiple-output switching power source apparatus of Embodiment 1 can remove the control circuit 12-3 and switching element Q3 of the multiple-output switching power source apparatus of the related art illustrated in FIG. 1 employing three converters, and therefore, can reduce costs and stabilize outputs.

Embodiment 2

Figure 7:
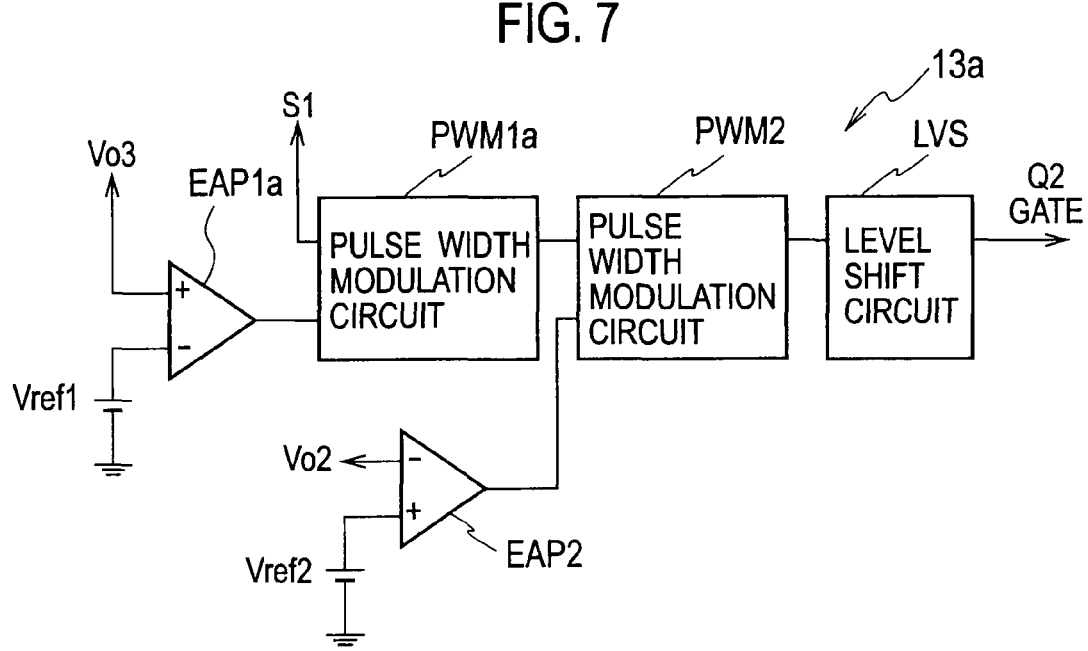
FIG. 7 is an internal circuit diagram illustrating a control circuit 13a in a multiple-output switching power source apparatus according to Embodiment 2.
Figure 8:
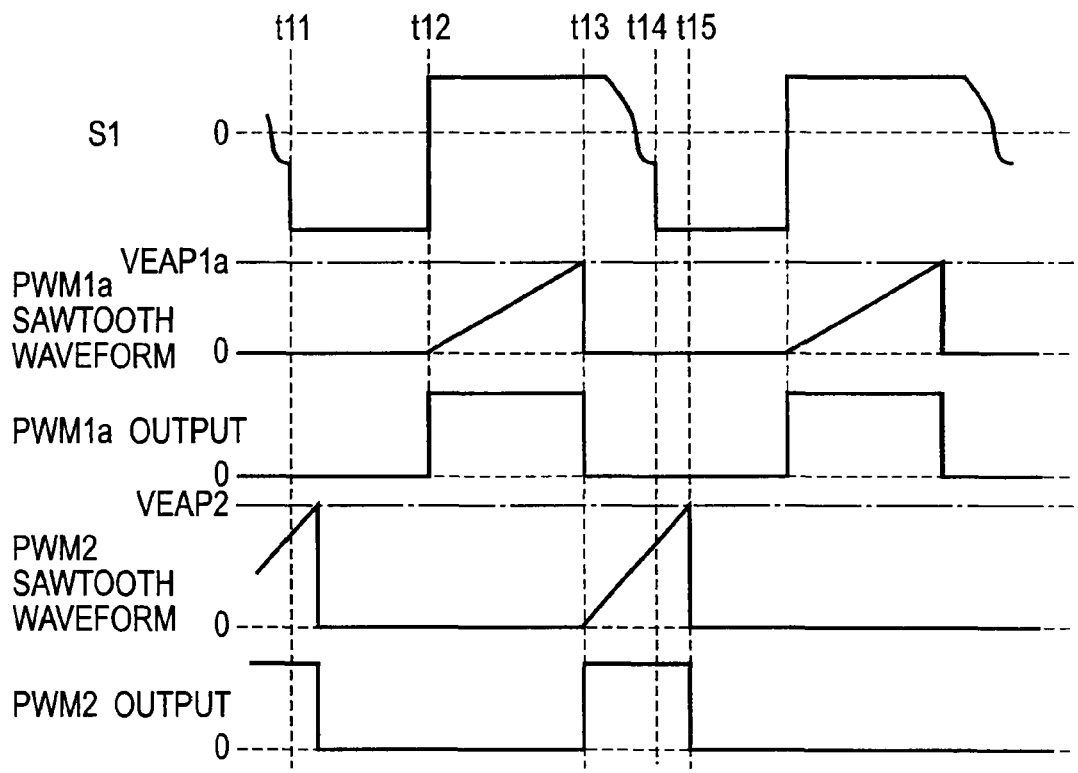
FIG. 8 is a timing chart illustrating operation of the control circuit 13a according to Embodiment 2.

FIG. 7 is an internal circuit diagram illustrating a control circuit 13a of a multiple-output switching power source apparatus according to Embodiment 2. FIG. 8 is a timing chart illustrating operation of the control circuit 13a according to Embodiment 2. The circuit configuration of Embodiment 2 is similar to that of Embodiment 1 illustrated in FIG. 2 and differs therefrom only in the internal circuit of the control circuit 13a.

Namely, the control circuit 13 of Embodiment 1 uses the voltage of the first secondary winding S1 of the transformer T1a to detect that the switching element Q1 turns on and controls a time from when the switching element Q1 turns on to when the switching element Q2 turns on.

On the other hand, the control circuit 13a of Embodiment 2 detects a positive voltage of the first secondary winding S1 of the transformer T1a, to detect that the switching element Q1 turns off and controls a time from when the switching element Q1 turns off to when the switching element Q2 turns on.

The control circuit 13a has an error amplifier EAP1a, an error amplifier EAP2, a pulse width modulation circuit PWM1a, a pulse width modulation circuit PWM2, and a level shift circuit LVS.

A non-inverting input terminal of the error amplifier EAP1a is connected to the first end of the capacitor C3 to receive the third output voltage Vo3 and an inverting input terminal thereof receives a reference voltage Vref1.

Input terminals of the pulse width modulation circuit PWM1a are connected to the first end of the secondary winding S1 of the transformer T1a and an output terminal of the error amplifier EAP1a. Input terminals of the pulse width modulation circuit PWM2 are connected to an output terminal of the pulse width modulation circuit PWM1a and an output terminal of the error amplifier EAP2.

The remaining configuration of the control circuit 13a of Embodiment 2 illustrated in FIG. 7 is the same as that of the control circuit 13 of Embodiment 1 illustrated in FIG. 3, and therefore, the explanation thereof is omitted.

Next, operation of the control circuit 13a illustrated in FIG. 7 will be explained with reference to the timing chart of FIG. 8.

The error amplifier EAP1a compares the third output voltage Vo3 with the reference voltage Vref1 and outputs an error voltage signal VEAP1a between the third output voltage Vo3 and the reference voltage Vref1 to the pulse width modulation circuit PWM1a.

The pulse width modulation circuit PWM1a outputs (for example, at time t12) a pulse voltage (PWM1a output) in synchronization with a positive voltage generated by the first secondary winding S1 of the transformer T1a, i.e., in synchronization with OFF of the switching element Q1. At the same time, an internal sawtooth wave generation circuit generates a PWM1a sawtooth waveform signal.

When the voltage of the PWM1a sawtooth waveform signal reaches (for example, at time t13) the voltage VEAP1a from the error amplifier EAP1a, the pulse voltage from the pulse width modulation circuit PWM1a becomes low. Namely, the voltage VEAP1a from the error amplifier EAP1a is used to change the period (from t12 to t13) during which the pulse width modulation circuit PWM1a outputs the pulse voltage.

The third output voltage Vo3 is supplied to the non-inverting input terminal of the error amplifier EAP1a. When the third output voltage Vo3 becomes smaller than the reference voltage Vref1, the voltage VEAP1a from the error amplifier EAP1a decreases to shorten the period during which the pulse width modulation circuit PWM1a outputs a pulse voltage. On the other hand, when the third output voltage Vo3 becomes larger than the reference voltage Vref1, the voltage VEAP1a from the error amplifier EAP1a increases to elongate the period during which the pulse width modulation circuit PWM1a outputs a pulse voltage.

The pulse width modulation circuit PWM2 outputs a pulse voltage (PWM2 output) in synchronization with a fall of the pulse voltage from the pulse width modulation circuit PWM1a. At the same time, a sawtooth wave generation circuit therein generates a PWM2 sawtooth waveform signal.

When the voltage of the PWM2 sawtooth waveform signal reaches (for example, at time t15) the voltage VEAP2 from the error amplifier EAP2, the pulse voltage from the pulse width modulation circuit PWM2 becomes low. Namely, depending on the voltage VEAP2 from the error amplifier EAP2, the period (from t13 to t15) during which the pulse width modulation circuit PWM2 outputs a pulse voltage changes.

In this way, the control circuit 13a controls, with the third output voltage Vo3, a time (for example, from t12 to t13) from when the switching element Q1 turns off to when the switching element Q2 turns on, and with the second output voltage Vo2, controls a time (for example, from t13 to t15) in which the switching element Q2 is ON.

Figure 9:
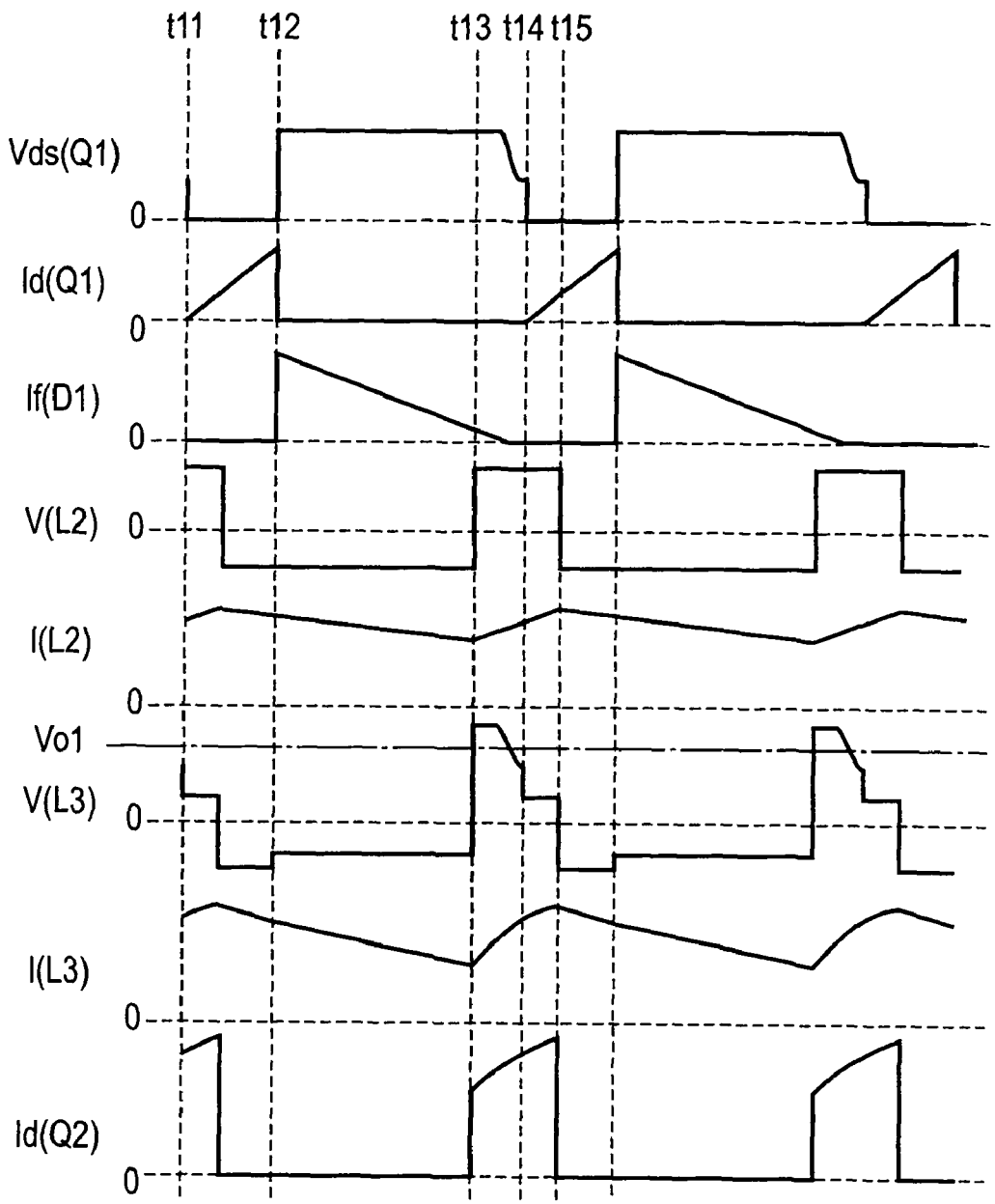
FIG. 9 is a waveform diagram illustrating operation of the multiple-output switching power source apparatus according to Embodiment 2 of the present invention.

Next, operation under heavy load of the multiple-output switching power source apparatus according to Embodiment 2 will be explained with reference to FIG. 9.

At time t11, a signal from the control circuit 12-1 turns on the switching element Q1, the primary winding P1 of the transformer T1a receives the input voltage Vin, and the switching element Q1 passes, as a drain current Id(Q1), an excitation current of the primary winding P1.

At time t12, a signal from the control circuit 13a turns off the switching element Q1, excitation energy accumulated in the transformer T1a is discharged as a forward current If(D1) of the diode D1 from the first secondary winding S1 of the transformer T1a, and the current is smoothed by the capacitor C1 and is outputted to the first output terminal.

At the same time, the second secondary winding S2 of the transformer T1a generates a voltage obtained by multiplying the voltage generated by the first secondary winding S1, i.e., approximately the first output voltage Vo1 by a turn ratio. The turn ratio is set so that the voltage generated by the second secondary winding S2 is lower than the third output voltage Vo3. Then, no current passes through the reactor L3 during this period.

At time t13, a signal from the control circuit 13a turns on the switching element Q2 and the reactor L2 receives a differential voltage between the first output voltage Vo1 and the second output voltage Vo2, to increase a current I(L2) passing through the reactor L2.

At the same time, the reactor L3 receives through the diode D4 a differential voltage between the sum of the first output voltage Vo1 and the voltage of the second secondary winding S2 and the third output voltage Vo3, to increase a current I(L3) passing through the reactor L3.

At time t14, the switching element Q1 again turns on, the voltage generated by the second secondary winding S2 of the transformer T1a inverts, and a voltage V(L3) applied to the reactor L3 changes to a differential voltage between a voltage obtained by subtracting the voltage of the second secondary winding S2 from the first output voltage Vo1 and the third output voltage Vo3, to make the inclination of the current I(L3) of the reactor L3 gentler.

At time t15, the switching element Q2 turns off, a voltage V(L2) to the reactor L2 disappears, and energy accumulated in the reactor L2 is discharged through the regenerative diode D2 to the second output terminal. Also, the voltage V(L3) to the reactor L3 disappears and energy accumulated in the reactor L3 is discharged through the regenerative diode D3 to the third output terminal. The above-mentioned operation is repeated to supply power to the second output terminal and third output terminal.

The converter to output the second output voltage Vo2 has a configuration similar to the step-down chopper of the related art, and therefore, an input voltage, i.e., the first output voltage Vo1 and the ON/OFF duty ratio of the switching element Q2 determine the second output voltage V02. Namely, the control circuit 13a controls a time from t13 to t15, to control the second output voltage Vo2.

The converter to output the third output voltage Vo3 is similar to the converter to output the third output voltage Vo3 of Embodiment 1. Namely, it averages voltages applied in the period from t13 to t15 through the reactor L3 and capacitor C3 and outputs the averaged voltage. Namely, like Embodiment 1, extending the period from t13 to t14 results in providing larger power and shortening the period from t13 to t14 results in reducing the power. Namely, the control circuit 13a controls the time (t12 to t13) from when the switching element Q1 turns off to when the switching element Q2 turns on, to control the third output voltage Vo3.

In this way, the multiple-output switching power source apparatus according to Embodiment 2 provides effect similar to that provided by the multiple-output switching power source apparatus of Embodiment 1.

The present invention is not limited to the multiple-output switching power source apparatuses of Embodiments 1 and 2. According to the multiple-output switching power source apparatuses of Embodiments 1 and 2, the converter to provide the first output voltage Vo1 is a flyback converter. It may be a forward converter or a half-bridge-configuration converter, to provide the same effect.

According to Embodiments 1 and 2, the primary side of the transformer T1a includes a series circuit of the primary winding P1 and switching element Q1. For example, the primary side of the transformer T1a may be of a current resonant type involving a series circuit of the primary winding P1, a reactor, a current resonant capacitor, and the switching element Q1.

Effect of the Invention

The present invention is able to remove a switching element and control circuit from the three-converter-type multiple-output switching power source apparatus according to the related art, to realize a multiple-output switching power source apparatus that employs inexpensive circuit parts to stabilize each output.

(United States Designation)

This application claims benefit of priority under 35 USC §119 to Japanese Patent Application No. 2007-220068 as filed on Aug. 27, 2007, the entire contents of which are incorporated by reference herein.

The invention claimed is:

1. A multiple-output switching power source apparatus comprising:
   a transformer having a primary winding, a first secondary winding, and a second secondary winding;

a first control circuit to adjust a time for applying a DC voltage to the primary winding of the transformer by turning on/off a first switching element;

a first rectifying-smoothing circuit to rectify and smooth a voltage generated by the first secondary winding of the transformer and provide a first output voltage;

a second switching element whose first end is connected to an output terminal of the first rectifying-smoothing circuit;

a second rectifying-smoothing circuit connected to a second end of the second switching element, to rectify and smooth a voltage generated at the second end of the second switching element and provide a second output voltage;

a third rectifying-smoothing circuit to rectify and smooth a voltage generated at a second end of the second secondary winding of the transformer and provide a third output voltage, a first end of the second secondary winding of the transformer being connected to the second end of the second switching element; and a second control circuit to adjust an ON/OFF time of the second switching element according to the second and third output voltages.

2. The multiple-output switching power source apparatus according to claim 1, wherein the second control circuit adjusts a time from when the first switching element turns on to when the second switching element turns on according to the third output voltage, and adjusts a period during which the second switching element is ON according to the second output voltage.

3. The multiple-output switching power source apparatus according to claim 1, wherein the second control circuit adjusts a time from when the first switching elements turns off to when the second switching element turns on according to the third output voltage, and adjusts a period during which the second switching element is ON according to the second output voltage.

4. The multiple-output switching power source apparatus according to claim 1, wherein the second control circuit adjusts a time from when the voltage of the first secondary winding of the transformer rises to when the second switching element turns according to the third output voltage, and adjusts a period during which the second switching element is ON according to the second output voltage.

5. The multiple-output switching power source apparatus according to claim 1, wherein the second control circuit adjusts a time from when the voltage of the first secondary winding of the transformer falls to when the second switching element turns on according to the third output voltage, and adjusts a period during which the second switching element is ON according to the second output voltage.

* * * * *